United States Patent
Hoemann

(10) Patent No.: US 10,270,300 B2
(45) Date of Patent: Apr. 23, 2019

(54) MOTOR WITH SECTIONED STATOR

(71) Applicant: Nidec Motor Corporation, St. Louis, MO (US)

(72) Inventor: Keith I. Hoemann, Fenton, MO (US)

(73) Assignee: Nidec Motor Corporation, St. Louis, MO (US)

( * ) Notice: Subject to any disclaimer, the term of this patent is extended or adjusted under 35 U.S.C. 154(b) by 400 days.

(21) Appl. No.: 15/094,768

(22) Filed: Apr. 8, 2016

(65) Prior Publication Data
US 2016/0301267 A1  Oct. 13, 2016

Related U.S. Application Data

(60) Provisional application No. 62/144,795, filed on Apr. 8, 2015.

(51) Int. Cl.
| | | |
|---|---|---|
| *H02K 1/14* | (2006.01) | |
| *H02K 3/28* | (2006.01) | |
| *H02K 21/22* | (2006.01) | |
| *H02K 7/14* | (2006.01) | |

(52) U.S. Cl.
CPC .............. *H02K 1/148* (2013.01); *H02K 3/28* (2013.01); *H02K 21/22* (2013.01); *H02K 7/14* (2013.01); *H02K 2213/03* (2013.01)

(58) Field of Classification Search
CPC .......... H02K 1/148; H02K 3/28; H02K 21/22; H02K 2213/03; H02K 7/14
USPC ........................................................ 310/184
See application file for complete search history.

(56) References Cited

U.S. PATENT DOCUMENTS

| | | | |
|---|---|---|---|
| 4,990,809 A | 2/1991 | Artus et al. | |
| 6,727,632 B2 | 4/2004 | Kusase | |
| 7,468,570 B2 | 12/2008 | Ionel et al. | |
| 8,994,244 B2 | 3/2015 | Horst | |
| 2006/0097601 A1 | 5/2006 | Hauger | |
| 2007/0236099 A1* | 10/2007 | Kim | D06F 37/304 310/266 |
| 2009/0134734 A1* | 5/2009 | Nashiki | B60L 7/00 310/162 |
| 2010/0156216 A1 | 6/2010 | Lee et al. | |
| 2010/0156231 A1 | 6/2010 | Lee et al. | |
| 2010/0171378 A1* | 7/2010 | Kim | D06F 37/304 310/43 |
| 2010/0295393 A1* | 11/2010 | Dunesme | H02K 3/28 310/71 |
| 2011/0316365 A1 | 12/2011 | Kim | |
| 2012/0074797 A1* | 3/2012 | Petter | H02K 21/16 310/51 |
| 2012/0175994 A1* | 7/2012 | Flynn | H02K 1/148 310/216.106 |

(Continued)

*Primary Examiner* — Alex W Mok
(74) *Attorney, Agent, or Firm* — Hovey Williams LLP

(57) ABSTRACT

A multiphase motor is provided. The motor includes a rotor rotatable about an axis and a sectioned stator. The sectioned stator includes one or more stator sections. Each stator section has a core section including a yoke and a plurality of arcuately spaced apart teeth that extend generally radially from the yoke. The stator includes a plurality of electrically conductive wire windings. Each of the windings corresponds with a respective power phase. Each stator section is wound with each of the windings such that each stator section includes windings for all of the power phases.

20 Claims, 13 Drawing Sheets

(56) References Cited

U.S. PATENT DOCUMENTS

2013/0328432 A1  12/2013  Hoemann
2016/0006303 A1   1/2016  Hoemann et al.

* cited by examiner

MOTOR WITH SECTIONED STATOR

CROSS-REFERENCE TO RELATED APPLICATIONS

This application claims the benefit of U.S. Provisional Application No. 62/144,795, filed Apr. 8, 2015, which is incorporated herein by reference in its entirety.

BACKGROUND OF THE INVENTION

1. Field of the Invention

The present invention relates generally to a motor having a sectioned stator.

2. Discussion of the Prior Art

Those of ordinary skill in the art will appreciate that motor fabrication, and particularly assembly of the stator, can be difficult, especially when dealing with large and/or high torque motors. These problems become acutely evident with winding of the stator.

SUMMARY

According to one aspect of the present invention, a multiphase motor is provided. The motor includes a rotor rotatable about an axis and a sectioned stator. The sectioned stator includes a plurality of arcuately arranged stator sections. Each of the stator sections has a core section including a yoke and a plurality of arcuately spaced apart teeth that extend generally radially from the yoke. The stator includes a plurality of electrically conductive wire windings. Each of the windings corresponds with a respective power phase. Each of the stator sections is wound with each of the windings such that each stator section includes windings for all of the power phases.

An alternative aspect of the present invention concerns a multiphase electric motor including a rotor rotatable about a rotor axis. The motor also includes a sectioned stator comprising a single stator section that extends substantially less than continuously around the rotor axis. The stator section includes a core section. The core section includes a yoke and a plurality of arcuately spaced apart teeth that extend generally radially from the yoke. The stator includes a plurality of electrically conductive wire windings, each of which corresponds with a respective power phase. The stator section is wound with each of the windings, such that the stator section includes windings for all of the power phases.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

Figure 1:
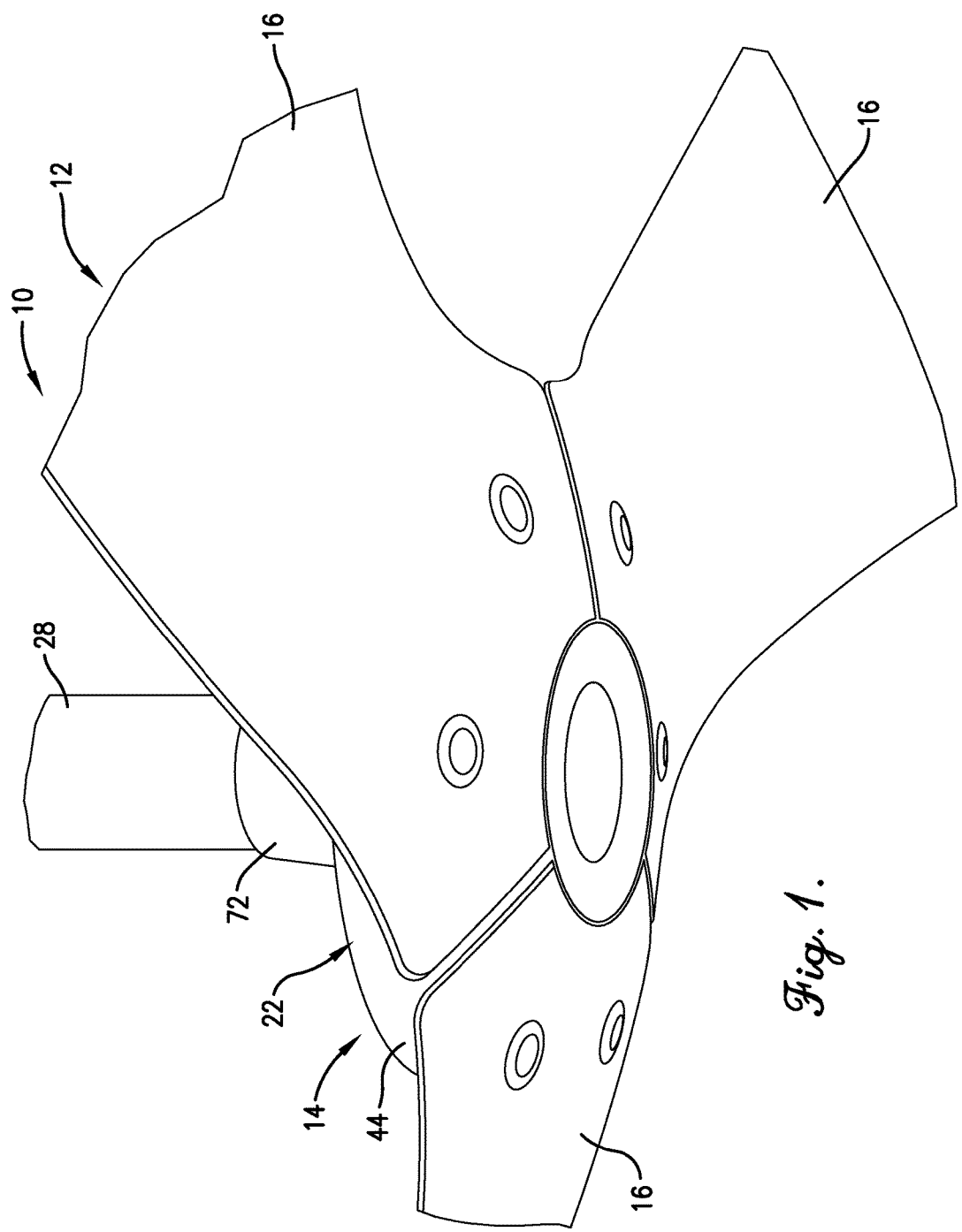
FIG. 1 is a bottom perspective view of a fan constructed in accordance with a preferred embodiment of the present invention.
Figure 2:
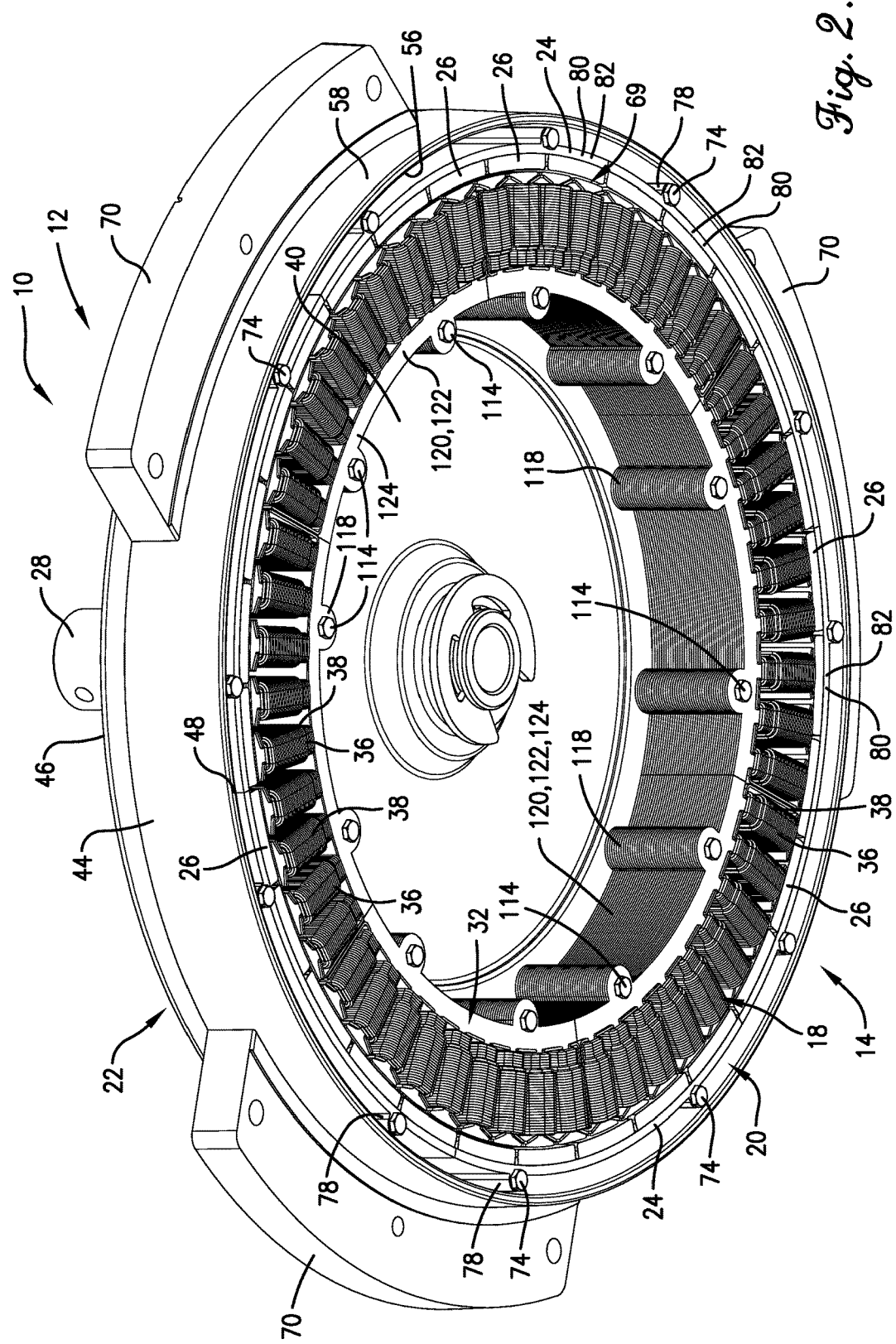
FIG. 2 is a bottom view of a portion of the fan of FIG. 1, particularly illustrating the rotor and stator of the fan motor.
Figure 3:
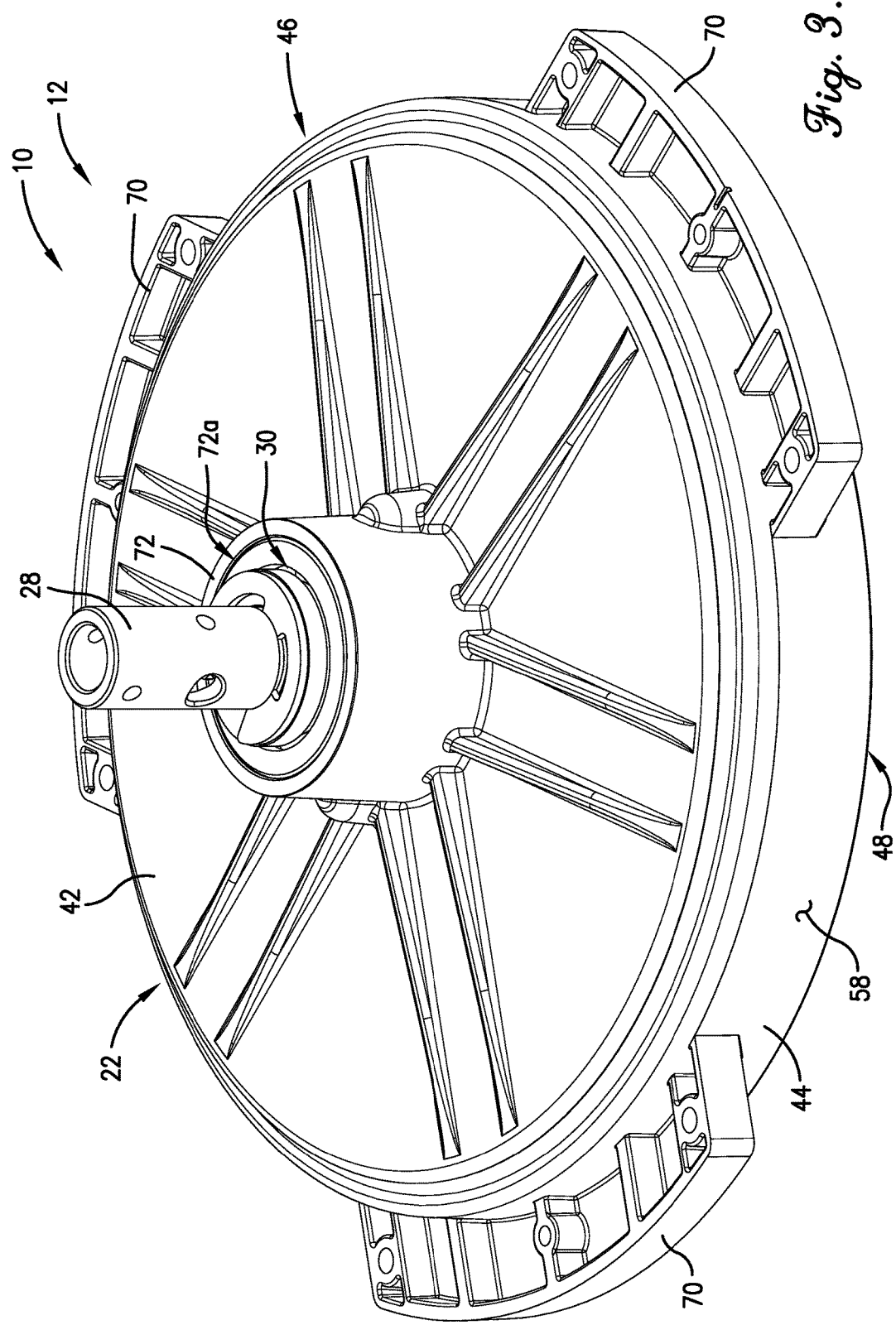
FIG. 3 is top view of the fan portion of FIG. 2, particularly illustrating the rotor can.

The drawing figures do not limit the present invention to the specific embodiments disclosed and described herein. The drawings are not necessarily to scale, emphasis instead being placed upon clearly illustrating the principles of the preferred embodiments.

Furthermore, directional references (e.g., top, bottom, front, back, side, etc.) are used herein solely for the sake of convenience and should be understood only in relation to each other. For instance, a component might in practice be oriented such that faces referred to as "top" and "bottom" are sideways, angled, inverted, etc. relative to the chosen frame of reference.

It is also noted that, as used herein, the terms axial, axially, and variations thereof mean the defined element has at least some directional component along or parallel to the axis. These terms should not be limited to mean that the element extends only or purely along or parallel to the axis. For example, the element may be oriented at a forty-five degree (45) angle relative to the axis but, because the element extends at least in part along the axis, it should still be considered axial. Similarly, the terms radial, radially, and variations thereof shall be interpreted to mean the element has at least some directional component in the radial direction relative to the axis.

It is further noted that the term annular shall be interpreted to mean that the referenced object extends around a central opening so as to be generally toroidal or ring-shaped. It is not necessary for the object to be circular, nor does the object have to be continuous. Similarly, the term toroidal shall not be interpreted to mean that the object must be circular or continuous.

DETAILED DESCRIPTION OF THE PREFERRED EMBODIMENTS

Introduction

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Overview

With initial reference to FIG. 1, a machine 10 is provided. The machine 10 preferably comprises an electric fan 12 for circulating air. The fan 12 is preferably a ceiling fan for industrial use. However, commercial and residential uses are permissible, as well. The fan 12 may also be configured for indoor use, outdoor use, or both without departing from the scope of the present invention. Yet further, it is permissible according to some aspects of the present invention, however, for the fan to be of an alternative type. The machine may alternatively be entirely devoid of an electric fan, such that the principles of the present invention may also apply to other applications.

The fan 12 preferably includes a motor 14 and plurality of airfoils or blades 16 driven by the motor 14 to cooperatively rotate about an axis. The blades 16 are preferably evenly arcuately spaced apart about the axis, although alternative blade arrangements are permissible without departing from the scope of the present invention. The number of blades may vary according to the particular fan application without departing from a scope of the present invention. The blades 16 preferably collectively rotate during operation of the motor 14 to thereby move air.

In a preferred embodiment, the fan 12 has an outer diameter, defined by the blades, of between about ten (10) feet and about twenty-four (24) feet. Varying fan diameters are permissible according to some aspects of the present invention, however.

As will be discussed in greater detail below, the motor 14 preferably has an outer diameter between about twenty (20) inches and about twenty-six (26) inches. Most preferably, the motor 14 has an outer diameter of about twenty-three (23) inches. As will also be discussed in greater detail below, the motor 14 design is preferably such that increases to the motor 14 outer diameter are not necessary to produce the increased torque required for larger diameter embodiments of the fan 12. That is, the motor 14 outer diameter of about twenty-three (23) inches is preferably the same for both a preferred ten (10) foot fan and a preferred twenty-four (24) foot fan.

The motor 14 weight preferably varies according to the overall fan 12 size. For instance, the motor 14 for a preferred ten (10) foot fan preferably weighs about twenty-eight and fifty-three hundredths (28.53) lb. The motor 14 for a preferred twenty-four (24) foot fan preferably weighs about one hundred eleven and ninety-nine hundredths (111.99) lb.

The motor 14 is preferably operable to produce high torques at low speeds. For instance, a preferred ten (10) foot fan preferably operates at a maximum speed of about one hundred fifty (150) rpm, with the motor 14 producing a maximum torque of about two hundred fifty (250) in-lb. A preferred twenty-four (24) foot fan preferably operates at a maximum speed of about sixty-five (65) rpm, with the motor 14 producing a maximum torque of about two thousand, one hundred fifty (2,150) in-lb. It is permissible, however, for the maximum torques and speeds to vary from the preferred values described above. For instance, the fan might instead by a high-speed fan.

The fan 12 may permissibly be a single-speed fan or have multiple speed settings (e.g., for higher-speed and lower-speed operation).

Although variations in axial height are permissible according to some aspects of the present invention, it is typically most desirable for the fan 12 to have a low vertical profile (excluding spacing from the ceiling or mounting surface, which can be adjusted as desired). More particularly, the vertical envelope required for the motor 14 and the blades 16 is preferably relatively small in relation to the outer diameter of the fan 12. Relevant dimensions of the motor 14 will be discussed in greater detail below.

The fan may suitably incorporate a variety of sensors, including but not limited to infrared motion sensors, ambient light sensors, and environmental sensors (e.g., temperature and humidity sensors). A wireless Internet chip might be embedded, and/or a predictive learning microprocessor might be included. Yet further, the fan may suitably be provided with a light. However, it is also permissible for the fan to be devoid of such additional features.

The fan 14 preferably is a direct drive fan (i.e., the fan 14 is preferably devoid of a gearbox). Furthermore, the fan 14 preferably includes an integrated control (not shown). It is permissible according to some aspects of the present invention, however, for the fan to instead include a gearbox and/or be associated with a non-integrated control system.

The motor 14 is preferably a high efficiency motor despite its preferred low operational speeds. More particularly, the motor 14 preferably achieves an efficiency of at least seventy percent (70%). More preferably, the motor achieves an efficiency of at least eighty percent (80%). Most preferably, the motor efficiency is at least eighty-five percent (85%).

The motor 14 preferably includes a stator 18 and a rotor 20 rotatable relative to the stator 18 about the axis. As will be discussed in greater detail below, portions of the rotor 20 preferably at least substantially circumscribe the stator 18, such that the motor 14 is an outer rotor motor. It is permissible according to some aspects of the present invention, however, for the motor to alternatively have an inner rotor or a dual rotor design.

The motor 14 preferably has a nine (9) slot to ten (10) pole ratio. Most preferably, the motor has fifty-four (54) slots and sixty (60) poles. Alternative slot:pole ratios and/or numbers of slots and poles are permissible, however, without departing from the ambit of the present invention.

As will be discussed in greater detail below, the rotor 20 preferably includes a rotor can 22, a rotor ring 24 fixed relative to the can 22, and a plurality of arcuately arranged magnets 26 fixed relative to the can 22 and the rotor ring 24.

The motor 14 preferably includes a stationary shaft 28 on which the rotor 20 is rotatably supported by a bearing assembly 30. The bearing assembly 30 may be of any type suitable for the particular application. For instance, the bearing assembly 30 may include a pair of ball bearing assemblies.

The rotor 20 is preferably rotatable about an axis at least in part defined by the shaft 28. However, an alternative rotation axis is permissible according to some aspects of the present invention. For instance, the rotation axis might at least in part be parallel to but radially offset from the shaft axis.

The stator 18 preferably includes a stator core 32, an electrically insulative covering 34 (best shown in FIGS. 10 and 11) overlying at least part of the stator core 32, and a plurality of coils 36 wound about the stator core 32. The motor 14 preferably includes a support platform 40 on which the stator core 32 is mounted.

For clarity and brevity, the direction of the shaft 28 extension relative to the remainder of the motor 14 will be described as being upward. Other directional references used herein will be based on this frame of reference. As noted previously, however, directional references used herein should be understood to relate only to each other and are not necessarily applicable relative to the broader environment in which the invention is operable.

Rotor

As noted previously, the rotor 20 preferably includes the rotor can 22, the rotor ring 24 fixed relative to the can 22, and the plurality of arcuately arranged magnets 26 fixed relative to the can 22 and the rotor ring 24.

The rotor can 22 preferably includes a generally radially extending base plate 42 and a sidewall 44 extending axially from the base plate 42 and arcuately about the axis. The illustrated sidewall 44 is continuous and circular in shape. However, with respect to certain aspects of the present invention, the sidewall can alternatively comprise spaced apart segments or have alternative shapes (although symmetry about the rotor axis is preferred). Furthermore, the sidewall may alternatively extend at a different angle from the base plate. Those of ordinary skill in the art will appreciate that the base plate may similarly be alternatively configured without departing from the spirit of the present invention. Preferably, the sidewall 44 extends at least generally downwardly from the base plate 42.

As will be discussed in greater detail below, the rotor ring 24 is preferably fixed relative to the base plate 42, while the magnets 26 are fixed relative to the rotor ring 24. The rotor ring 24 may suitably be configured solely as a support structure for the magnets or, alternatively, as both a backing ring and a magnet support structure. For instance, material selection for a rotor ring acting only as a magnet support structure may be made based primarily on structural properties and minimization of detrimental effects. Use of a synthetic resin and/or any one or more of a variety of metals therefore might be possible. A rotor ring that additionally acts as a backing ring, however, should be configured to allow high flux flow therethrough. The backing ring therefore might comprise one or more electrical grade steels and/or high carbon steels.

In a preferred outer rotor motor embodiment, the rotor ring 24 is at least substantially positioned radially inwardly relative to the sidewall 44, while the magnets 26 are at least substantially positioned radially inwardly relative to the rotor ring 24.

Furthermore, although the rotor ring 24 may present a solid, non-laminated structure, as illustrated, it is also permissible according to some aspects of the present invention for the rotor ring to be alternatively configured. For instance, the rotor ring might comprise a multiplicity of layers or laminations formed into a ring.

The sidewall 44 preferably defines axially spaced apart upper and lower margins 46 and 48. The upper margin 46 is preferably adjacent the base plate 42, while the lower margin 48 preferably defines the lowermost edge of the can 22.

The upper margin 46 and the lower margin 48 are preferably spaced apart a distance that may be referred to as the axial height of the sidewall 44. In keeping with the aforementioned preferred low profile fan configurations, the axial height of the sidewall 44 is preferably relatively small in relation to the outer diameter of the fan 12.

The rotor ring 24 and the rotor can 22 are preferably generally annular or toroidal in shape, respectively, while the sidewall 44 preferably extends at least substantially arcuately to have an at least substantially toroidal shape. More preferably, the rotor ring 24 and the rotor can 22 are preferably circular in shape, with the sidewall 44 extending at least substantially circumferentially.

As noted previously, the sidewall 44 preferably extends at least substantially continuously and most preferably extends entirely continuously. It is permissible according to some aspects of the present invention, however, for the sidewall to be segmented, perforated, or otherwise discontinuous.

The can 22 preferably has an outer diameter defined by the sidewall 44. More particularly, the sidewall 44 preferably defines an inner sidewall face 56 and an outer sidewall face 58. The outer sidewall face 58 defines the outer diameter of the can 22.

The inner sidewall face 56 and the outer sidewall face 58 are preferably parallel and preferably both extend at least substantially axially. It is permissible according to some aspects of the present invention, however, for the faces to be non-parallel and/or non-axially extending.

The rotor ring 24 preferably defines a pair of axially spaced apart upper and lower rotor ring faces 60 and 62 (i.e., a pair of end faces), respectively, that project at least generally outwardly relative to the axis. Furthermore, the rotor ring 24 preferably defines an inner rotor ring face 64 and an outer rotor ring face 66 (i.e., a pair of side faces).

The inner and outer rotor ring faces 64 and 66 are preferably radially spaced apart and generally oppositely directed. The inner and outer rotor ring faces 64 and 66 also preferably extend axially from and interconnect the upper and lower rotor ring faces 60 and 62. In a preferred embodiment, the upper and lower rotor ring faces 60 and 62 are preferably planar, parallel with each other, and at least substantially orthogonal to the axis. The upper and lower rotor ring faces 60 and 62 therefore are not only non-parallel with the inner and outer rotor ring faces 64 and 66, but also at least substantially orthogonal thereto. It is permissible according to some aspects of the present invention, however, for the faces of the rotor ring to be alternatively oriented relative to each other.

The rotor ring 24 preferably comprises steel or any other suitable magnetic material.

As noted previously, the magnets 26 are preferably evenly arcuately arranged and are fixed relative to the rotor ring 24. It is permissible, however, for the magnets to be unevenly and/or non-arcuately arranged.

In a preferred embodiment, the magnets 26 are fixed to one of the inner and outer rotor ring faces 64 and 66. As noted above, the motor 14 is most preferably an outer rotor motor, with the magnets 26 being mounted to the inner rotor ring face 64 and with the rotor ring 24 and the magnets 26 at least substantially circumscribing the stator 18.

The magnets 26 are preferably adhered to the rotor ring 24, although any one or more of a variety of mounting means may be used without departing from the scope of the present invention. For instance, the rotor ring could additionally provide structure (e.g., a shelf) for further support of the magnets.

In a preferred embodiment, thirty (30) magnets 26 are provided and configured relative to one another in such a manner that the motor has sixty (60) poles. It is permissible according to some aspects of the present invention, however, for more or fewer magnets to be provided and/or for the magnets to be alternatively configured.

Each magnet 26 preferably has a radial depth from about seven (7) mm to about eleven (11) mm and an arcuate length from about fifty (50) mm to about sixty (60) mm. Most preferably, each magnet 26 has a radial depth of about nine (9) mm and an arcuate length of about fifty-seven (57) mm. In keeping with the preferred constant outer diameter of the motor 14, the above-referenced magnet dimensions preferably do not vary from one fan size (outer diameter as measured at the tips of the blades 16) to another.

In contrast, however, each magnet 26 preferably has an axial height that does vary in accordance with the fan 12 outer diameter. For instance, magnets 26 associated with a preferred ten (10) foot fan 12 preferably have an axial height of about eighteen and seven tenths (18.7) mm. In contrast, magnets 26 associated with a preferred twenty-four (24) foot fan 12 preferably have an axial height of about sixty-nine and five tenths (69.5) mm.

The magnets 26 preferably cooperatively define a rotor inner margin 68. The rotor inner margin 68 preferably defines a inner diameter of the rotor 20 that is between five hundred thirty-five (535) mm and about five hundred seventy-five (575) mm. Most preferably, the inner diameter of the rotor 20 is approximately five hundred fifty-five (555) mm.

The magnets 26 also cooperate with the stator 18 to define an air gap 69 for the motor, as will be described in greater detail below.

The magnets 26 are preferably permanent magnets. More preferably, the magnets 26 are ferrite permanent magnets. It is permissible according to some aspects of the present invention, however, for the magnet type to vary. For instance, the magnets could alternatively comprise neodymium or any other suitable rare earth magnetic material.

In a preferred embodiment, the blades 16 are mounted to the can 22. More particularly, the can 22 preferably includes a plurality of mounting flanges 70 on which the blades 16 are mounted. Preferably, the number of mounting flanges 70 is equal to the number of blades 16. In the illustrated embodiment, for instance, three (3) mounting flanges 70 are provided for mounting of three (3) blades 16.

The mounting flanges 70 each preferably extend generally radially outwardly from the sidewall 44. Furthermore, the mounting flanges 70 are preferably evenly arcuately spaced apart.

The can 22 preferably includes a bearing housing 72 that defines a bearing pocket 72a that at least in part receives the bearing assembly 30. The pocket 72a and the rotor ring 24 are preferably at least substantially concentric.

Furthermore, the can 22, the rotor ring 24, the magnets 26, and the blades 16 are preferably collectively at least substantially rotationally symmetrical and at least substantially rotationally balanced.

In a preferred embodiment, the can 22 is diecast of a metal material, with the base plate 42, the sidewall 44, and the mounting flanges 70 being integrally formed. It is permissible according to some aspects of the present invention, however, for the can to be alternatively formed or to comprise one or more alternative materials. The can might be molded and/or machined, for instance, or comprise plastic.

Figure 4:
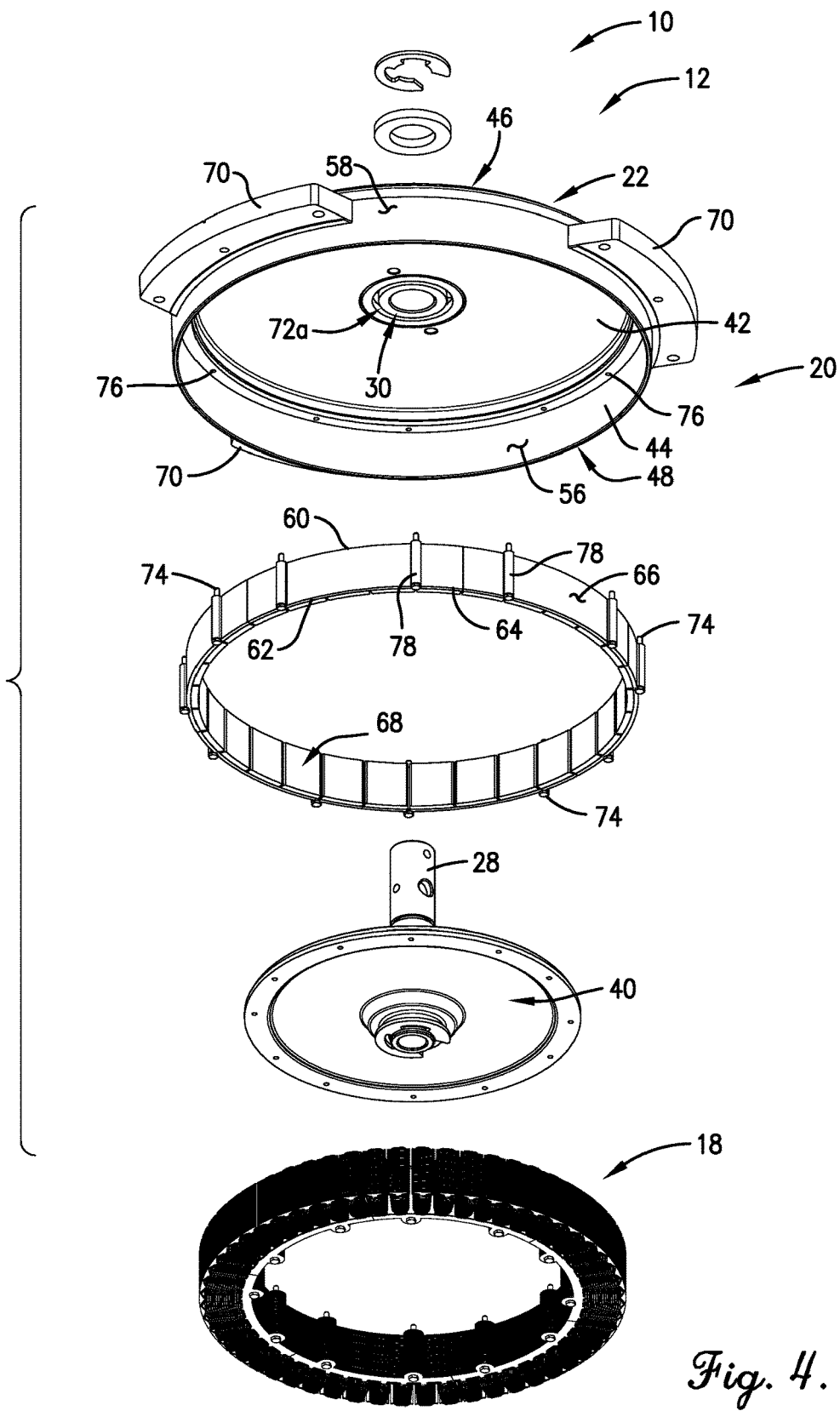
FIG. 4 is an exploded bottom view of the fan portion of FIGS. 2 and 3.
Figure 5:
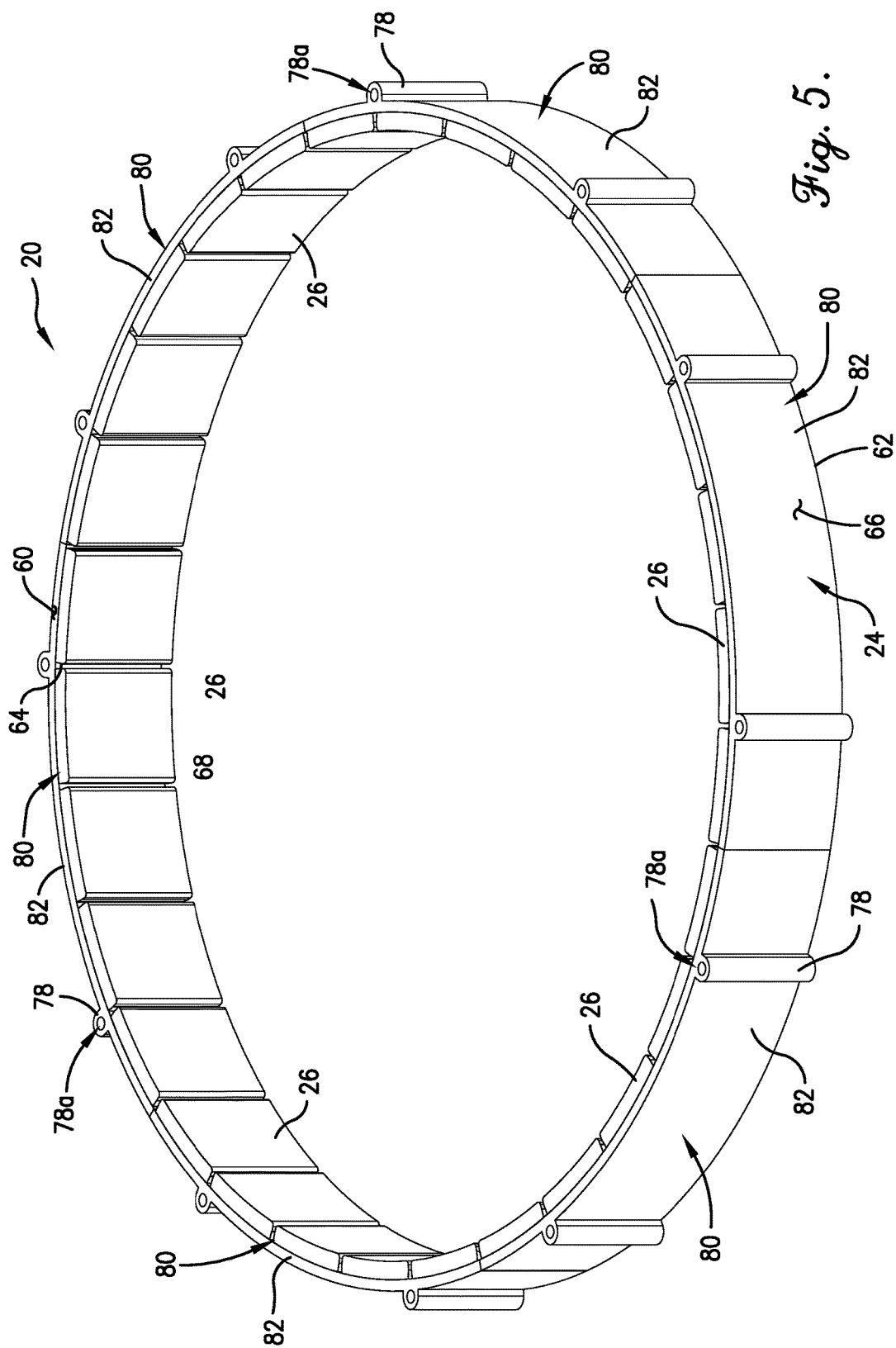
FIG. 5 is a top perspective view of the rotor ring, magnets, and mounting lugs of the rotor.
Figure 6:
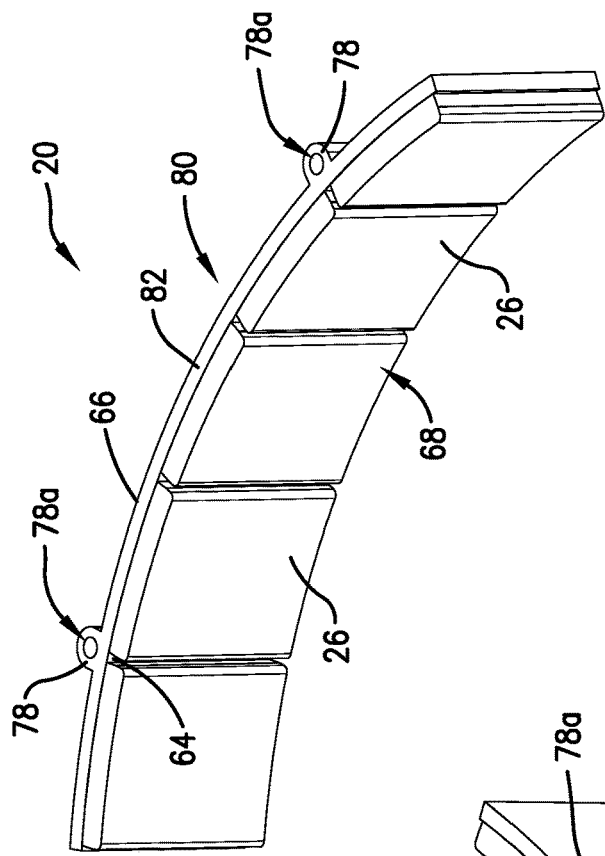
FIG. 6 is an inner top perspective view of a single section of the rotor of FIG. 5.
Figure 7:
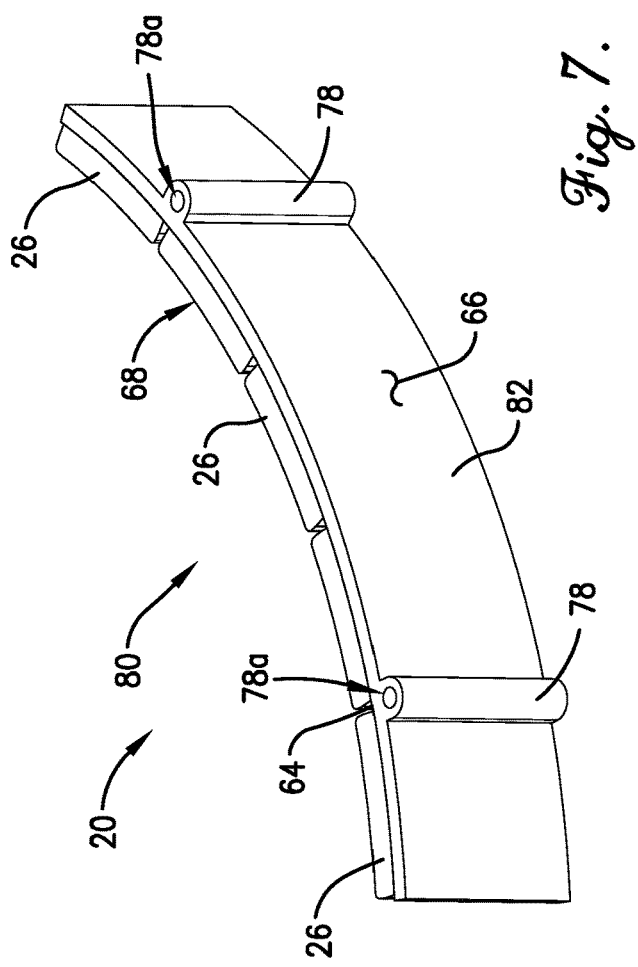
FIG. 7 is an outer top perspective view of the rotor section of FIG. 6.
Figure 8:
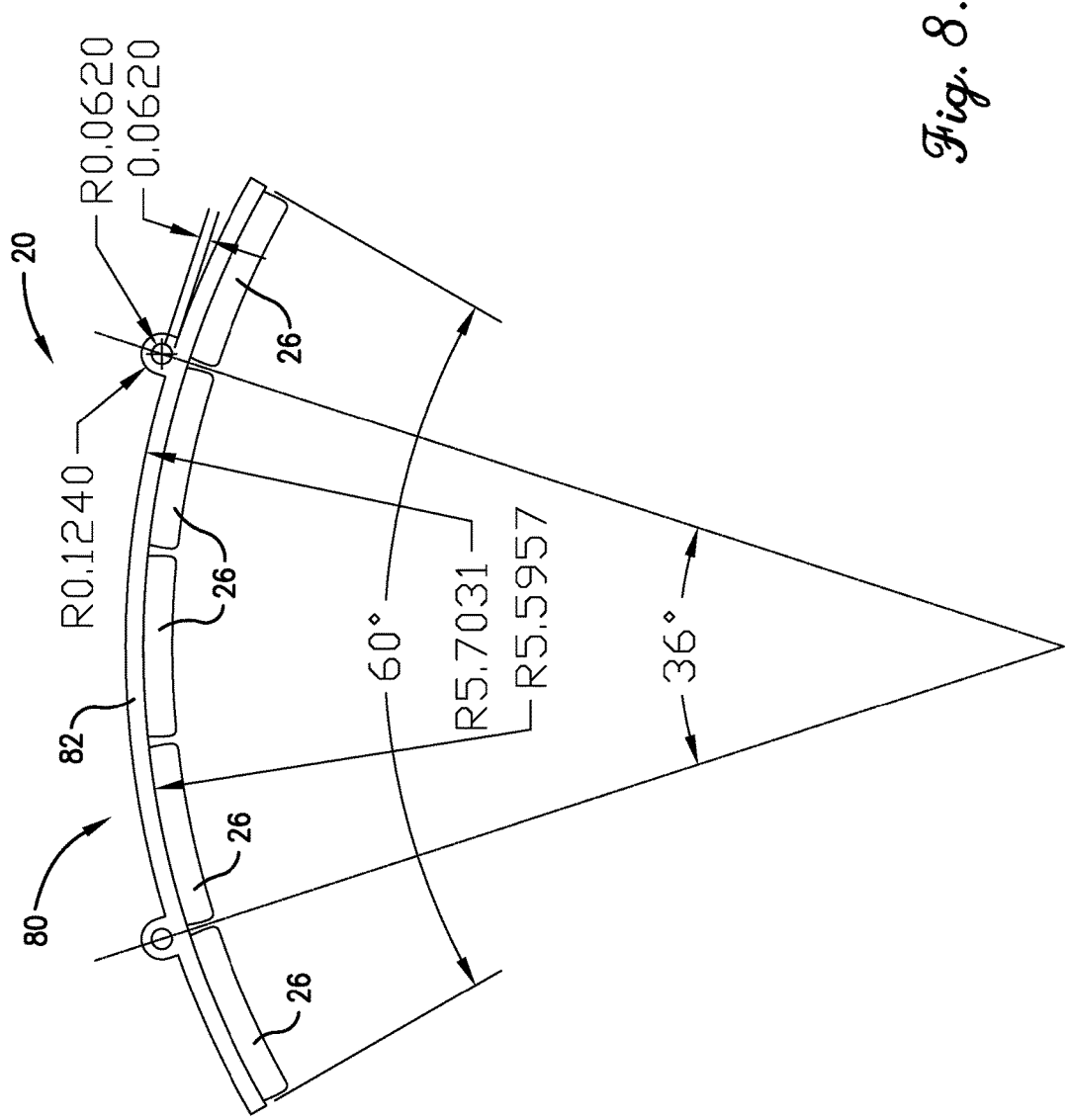
FIG. 8 is a top view of the rotor section of FIGS. 6 and 7.

Preferably, the rotor ring 24 is secured to the base plate 42 of the can 22 by means of a plurality of fasteners 74. More particularly, the base plate 42 preferably defines a plurality of fastener-receiving openings 76 (see FIG. 4). A corresponding plurality of fastener-receiving lugs 78, each including an aperture 78a, extend radially outwardly from the rotor ring 24. Each of the fasteners 74 extends through a corresponding one of the apertures 78a in the lugs 78 and into a corresponding one of the fastener-receiving openings 76 to secure the rotor ring 24 and, in turn, the magnets 26, relative to the rotor can 22.

In the illustrated embodiment, the fastener-receiving openings 76 are blind holes. It is permissible, however, for the fastener-receiving openings to instead be through holes.

In a preferred embodiment, the lugs 78 are integrally formed with the rotor ring 24. It is permissible according to some aspects of the present invention, however, for the lugs to alternatively be discrete components attached to the rotor ring by any sufficiently strong and secure means known in the art. Such means should be capable of supporting the weight of the rotor ring and magnets and withstanding the forces associated with operation of the fan known in the art. For instance, certain welding techniques or adhesive might be used.

Furthermore, it is permissible according to some aspects of the present invention for the rotor ring and magnets to be secured to the can without the use of fasteners. For instance, in an alternative embodiment, the can might instead be diecast in an overlying relationship with at least part of the rotor ring, with the sidewall and the rotor ring thereby being securely interengaged so as to restrict relative shifting therebetween.

In a preferred embodiment, the can 22 comprises aluminum. It is permissible according to some aspects of the present invention, however, for the can to comprise one or more alternative materials, although such materials are limited in cases in which the preferred diecasting process is used. If the can is instead molded, for instance, plastic might be used.

In a preferred embodiment, the rotor 20 comprises a plurality of rotor sections 80. More particularly, the rotor 20 preferably comprises six (6) rotor sections 80. Each rotor section 80 preferably comprises a rotor ring section 82 and five (5) of the magnets 26.

Preferably, two (2) lugs 78 are associated with each of the rotor sections 80. It is also preferred that adjacent lugs 78 of adjacent sections 80 be spaced more closely to one another than the pair of lugs 78 associated with a single one of the sections 80. It is permissible, however, for the lugs to be evenly arcuately spaced apart or unevenly arcuately spaced apart in a different manner.

Provision of a sectioned rotor 20 is advantageous for several reasons. For instance, the rotor sections 80 may be magnetized by a smaller magnetizer than would be required for magnetization of the entire rotor 20. Furthermore, particularly in view of the large dimensions and weight of the rotor 20, provisions of rotor sections 80 enables more convenient and manageable assembly of the of the motor 14.

It is noted, however, that it is permissible according to some aspects of the present invention for the rotor to be non-sectioned. That is, the rotor ring may alternatively be a continuous structure. Furthermore, more or fewer than the preferred six (6) sections may be provided.

Stator

As noted previously, the stator 18 is preferably an insulated stator and includes the stator core 32, an electrically insulative covering 34 overlying at least part of the stator core 32, and a plurality of coils 36 wound about the stator core 32. The motor 14 preferably includes the support platform 40 on which the stator core 32 is mounted.

In a preferred embodiment, the stator 18 is preferably generally toroidal in form. The stator core 32 is likewise preferably generally toroidal in form and defines an axis of the stator 18. Preferably, the axis of the stator 18 is coaxial with that of the rotor 20. However, it is permissible according to some aspects of the present invention for the axes to be non-coaxial.

The stator core 32 preferably includes an annular yoke 84 and a plurality of arcuately spaced apart teeth 86 extending at least generally radially from the yoke 84. Preferably, the teeth 86 extend radially outwardly from the yoke 84 (because of the preferred outer rotor motor design), although it permissible according to some aspects of the present invention for the teeth to extend generally inwardly.

Each tooth 86 preferably includes a generally radially extending arm 88 and a generally arcuately extending crown 90 extending from one end of the arm 88. Each crown 90 preferably defines a pair of arcuately spaced apart tips 92.

Each crown 90 further preferably presents a circumferential crown face 94 spaced opposite the yoke 84. The circumferential crown faces 94 preferably cooperatively define a first radial margin 96 of the stator core 32. Again, because the illustrated motor 14 has an outer rotor design, the circumferential crown faces 94 are preferably outer circumferential faces, such that the first radial margin 96 is a radially outermost margin.

The yoke 84 preferably presents an inner circumferential yoke face 98 and an outer circumferential yoke face 100. One of the inner and outer circumferential yoke faces 98 and 100 preferably defines a second radial margin 102 of the stator core 32. Preferably, the inner circumferential yoke face 98 defines the second radial margin 102 of the stator core 32, such that the second radial margin 102 is a radially innermost margin. In such an embodiment, it will be readily apparent of one of ordinary skill in the art that the outer circumferential yoke face 100 is discontinuous due to the teeth 86 extending therefrom.

The stator core 32 preferably has an outer diameter defined by the first radial margin 96 (as cooperatively defined by the outer crown faces 94). The outer diameter of the stator core 32 is preferably between about five hundred thirty (530) mm and about five hundred seventy (570) mm. Most preferably, the outer diameter of the stator core 32 is about five hundred fifty-two (552) mm. In keeping with the preferred constant outer diameter of the motor 14, the outer diameter of the stator core 32 preferably does not vary from one fan size (as determined by the diameter presented by the blades 16) to another.

Preferably, the covering 34 does not overlie the faces 94 of the teeth 86, such that the outer core diameter consequently defines the outer diameter of the stator 18 as a whole.

The stator core 32 preferably has an inner diameter defined by the second radial margin 102. The inner diameter of the stator core 32 is preferably between about three hundred ninety-five (395) mm and four hundred thirty-five (435) mm. Most preferably, the inner diameter of the stator core 32 is approximately four hundred sixteen (416) mm. In keeping with the preferred constant outer diameter of the motor 14, the inner diameter of the stator core 32 preferably does not vary from one fan size (as determined by the diameter presented by the blades 16) to another.

As noted previously, the rotor 20 preferably at least substantially circumscribes the stator 18. More particularly, each of the magnets 26 is preferably spaced radially outwardly from the first radial margin 96 of the stator core 32, such that the stator core 32 and the magnets 26 cooperatively define the circumferentially extending gap 69 therebetween. (That is, the inner diameter of the rotor 20 is preferably slightly larger than the outer diameter of the stator core 32.)

The gap 69 is preferably about one and five tenths (1.5) mm in radial thickness, in keeping with the aforementioned most preferred rotor 20 inner diameter of about five hundred fifty-five (555) mm and the aforementioned most preferred stator core 32 outer diameter of about five hundred fifty-two (552) mm. In keeping with the preferred gap 69, the However, the gap thickness may vary without departing from the scope of some aspects of the present invention.

Preferably, the yoke 84 and the teeth 86 cooperatively further present opposite axial end faces 106 and 108. The end faces 106 and 108 are preferably at least substantially planar and parallel with each other, although non-parallel and/or non-planar surfaces are permissible according to some aspects of the present invention.

The end faces 106 and 108 are preferably axially spaced apart a distance defining an axial height of the stator core 32. The axial height of stator core 32 preferably varies in keeping with motor/fan size and desired torque. More particularly, it is preferable that variations in the axial height of the stator core 32 at least in part and, more preferably, at least substantially account for increases in the fan torque without changes to the outer diameter of the motor 14. That is, although provision of a large motor 14 outer diameter enables an initially high baseline maximum torque, increased torque production is preferably achieved by increasing the axial height of the stator core 32.

For instance, in a preferred ten (10) foot fan 12 producing up to about two hundred fifty (250) in-lb of torque, the stator core 32 is about one half (0.500) inch tall. In contrast, in a preferred twenty-four (24) foot fan producing up to about two thousand, one hundred fifty (2,150) in-lb of torque, the stator core 32 is about two and one half (2.500) inches tall. It is permissible, however, for the axial core height to vary from the preferred values described above.

The stator core 32 is preferably a laminated core comprising a stack of laminations (not shown), such that the axial height of the stator core 32 may also be referred to as a stack height. However, it is permissible for the core to be a solid core without departing from the scope of the present invention.

The stator core 32 preferably comprises steel. More particularly, the core 32 preferably comprises M47-10 steel. However, it is permissible without departing from the scope of some aspects of the present invention for any one or more of a variety of materials, including alternate grades of steel, to be used for the core.

In keeping with the aforementioned variations in stack height, the weight of the stator core 32 preferably varies in accordance with the size of the fan 12. For instance, in a preferred ten (10) foot fan 12, the stator core 32 preferably weighs about ten and thirty-three hundredths (10.33) lb. In a preferred twenty-four (24) foot fan, the stator core 32 preferably weighs about fifty-three and sixty-six hundredths (53.66) lb.

In a preferred embodiment, as illustrated, the teeth 86 are broadly configured in such a manner as to enable convenient winding, minimize cogging, and increase motor efficiency. For instance, the teeth 86 are preferably dimensioned in such a manner as to be generally long and narrow. More particularly, each crown 90 preferably extends an arcuate distance of about twenty-eight (28) mm. The tips 92 of adjacent teeth preferably define a gap 109 therebetween having an arcuate dimension of about four and sixty-four thousandths (4.064) mm. Each arm 88 preferably has a generally radial width of about eight (8) mm, while the radial length of each tooth 86 (i.e., the length of the arm 88 plus the radial dimension of the crown 90) is about fifty-five (55) mm. That is, the ratio of the arm 88 length to width is about six and eight hundred seventy-five thousandths to one (6.875 to 1).

Provision of long, narrow teeth 86 enables several advantages. For instance, the coils 36 preferably comprise electrically conductive wiring 38. Provision of long, narrow teeth 86 enables a reduction in the length of the end turns of the coils 36, which reduces material costs associated with the wiring 38. Furthermore, a reduction in the amount of wiring 38 required for formation of the coils 36 results in lower resistance and, in turn, greater motor 14 efficiency. Such reduction is particularly advantageous in a low-speed motor such as the preferred motor 14, since wire losses are associated with a significant portion (for instance, about 95%) of losses in low-speed motors.

Preferably, the teeth 86 each present a pair of side faces 110 extending between and interconnecting the upper and lower end faces 106 and 108. Each side face 110 projects generally radially between the outer yoke face 100 and the outer circumferential face 94 of the tooth 86. Adjacent side faces 110 of each adjacent pair of teeth 86 preferably define a slot 112 therebetween. As noted previously, the stator core 32 preferably includes fifty-four (54) teeth 86 such that fifty-four (54) slots 112 are defined.

The stator 18 is preferably secured to the support platform 40 by means of a plurality of fasteners 114. More particularly, the support platform 40 preferably defines a plurality of fastener-receiving openings 116. A corresponding plurality of fastener-receiving lugs 118, each including an aperture 118a, extend radially inwardly from the yoke 84 of the stator core 32. Each of the fasteners 114 extends through a corresponding one of the apertures 118a in the lugs 118 and fastener-receiving openings 116 to secure the stator core 32 and, in turn, the windings 37, relative to the support platform 40.

In a preferred embodiment, the lugs 118 are integrally formed with the yoke 84. It is permissible according to some aspects of the present invention, however, for the lugs to alternatively be discrete components attached to the yoke by any sufficiently strong and secure means known in the art. Such means should be capable of supporting the weight of the rotor ring and magnets and withstanding the forces associated with operation of the fan. For instance, certain welding techniques or adhesive might be used.

Furthermore, it is permissible according to some aspects of the present invention for the stator to be secured to the support platform without the use of fasteners. For instance, in an alternative embodiment, the support platform might include structure extending along the radially innermost face of the yoke so as to secure the yoke relative to platform. In one such embodiment, for example, the structure might comprise a plurality of ribs configured to be heat-staked into a corresponding plurality of grooves formed in the inner circumferential yoke face.

The support platform 40 may be secured to the shaft 28 by any means known in the art. For instance, an interference fit might be utilized, and/or the shaft and platform might cooperatively define corresponding ribs and grooves.

Preferably, the support platform 40 is provided adjacent the base plate 42 of the rotor can 22. In such an embodiment, it is permissible for a stator cover (not shown) to be provided axially opposite the support platform to at least substantial enclose the stator and/or support additional motor structures such as lights or sensors. Such a cover may also be omitted without departing from the scope of the present invention.

It is also permissible according to some aspects of the present invention for the support platform to instead be positioned axially opposite the base plate of the rotor can so as to function both as a support platform for the stator and as a protective cover and/or support structure for other devices.

As noted previously, the coils 36 preferably comprise electrically conductive wiring 38. The wiring 38 is preferably wound about each of the teeth 86 through the slots 112 to form the coils 36, with each of the coils 36 corresponding to one of the teeth 86.

Each of the coils 36 preferably comprises a plurality of turns of the wiring 38. For instance, in a preferred ten (10) foot fan 12, each coil 36 preferably comprises two hundred fifty (250) turns. In a preferred twenty-four (24) foot fan, each coil 36 preferably comprises one hundred four (104) turns. It is permissible, however, for the number of turns to vary from the preferred values described above.

The wiring 38 preferably comprises copper, although aluminum or any of a variety of electrically conductive materials may be used without departing from the scope of some aspects of the present invention.

The gauge of the wiring 38 preferably varies in accordance with the fan 12 size. For instance, in a preferred ten (10) foot fan 12, the wire is preferably twenty (#20.0) gauge wire. In a preferred twenty-four (24) foot fan, the wire is preferably fifteen (#15.0) gauge wire. However, any one or more of a variety of wire gauges may be used without departing from the scope of the present invention.

As will be discussed in greater detail below, the covering 34 preferably comprises electrically insulative paper configured to insulate the stator core 32 from the wiring 38. More particularly, the covering 34 preferably comprises a plurality of individual slot inserts 34a inserted into the slots 112 to partly insulate the teeth 86. However, the covering may alternatively be of any type known in the art. For instance, the covering could alternatively comprise an electrically insulative powder coating or a synthetic resin material overmolded over the core. Another suitable alternative includes Mylar sheets positioned within the slots 112, in the manner described below.

In a preferred embodiment, as noted previously, the motor 14 includes an integrated control (not shown). The control is preferably positioned so as to be at least substantially circumscribed by the stator core 32. Furthermore, it is permissible for the control to be mounted to the stator support platform. Such positioning and mounting approach preferably enables integration of the control without an increase in the required motor envelope. It is permissible, however, for the control to be alternatively positioned and/or mounted.

As also noted previously, a stator cover (not shown) may be provided opposite the support platform. Such cover may suitably be configured to protect the control.

Preferably, the stator 18 is a segmented stator 18 comprising a plurality of stator sections 120. More particularly, the stator 18 preferably includes six (6) stator sections 120, although more or fewer stator sections may be provided. Each stator section 120 preferably comprises a core section 122 including a yoke section 124 and nine (9) of the teeth 86. Each stator section 120 further preferably includes the wiring 38 wound about the associated ones of the teeth 86.

The illustrated stator sections 120 cooperatively extend substantially continuously about the axis of rotation of the rotor 20, namely to form a circular shape. However, with respect to certain aspects of the present invention, the stator 18 can alternatively comprise one or several spaced apart stator sections or have alternative shapes (although symmetry about the rotor axis is preferred), as will be further described.

Preferably, two (2) lugs 118 are associated with each of the stator sections 120. However, more or fewer lugs could be provided, either on each section or in total. Furthermore, one or more of the sections might be provided with a different number of lugs than one or more others of the sections.

It is also preferred that adjacent lugs 118 of adjacent sections 120 be spaced more closely to one another than the pair of lugs 118 associated with a single one of the sections 120. It is permissible, however, for the lugs to be evenly arcuately spaced apart or unevenly arcuately spaced apart in a different manner.

Figure 9:
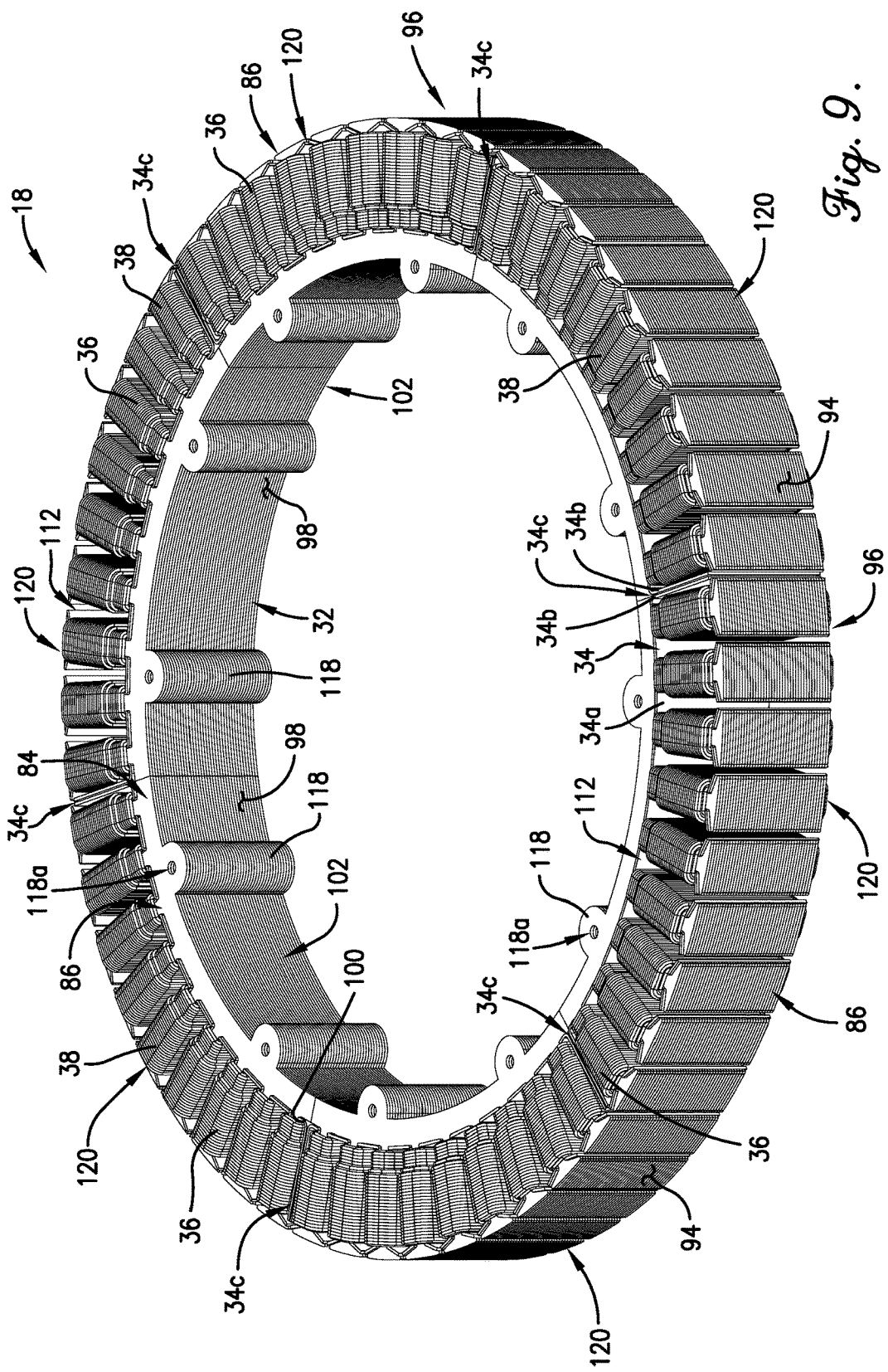
FIG. 9 is a top perspective view of the stator.
Figure 10:
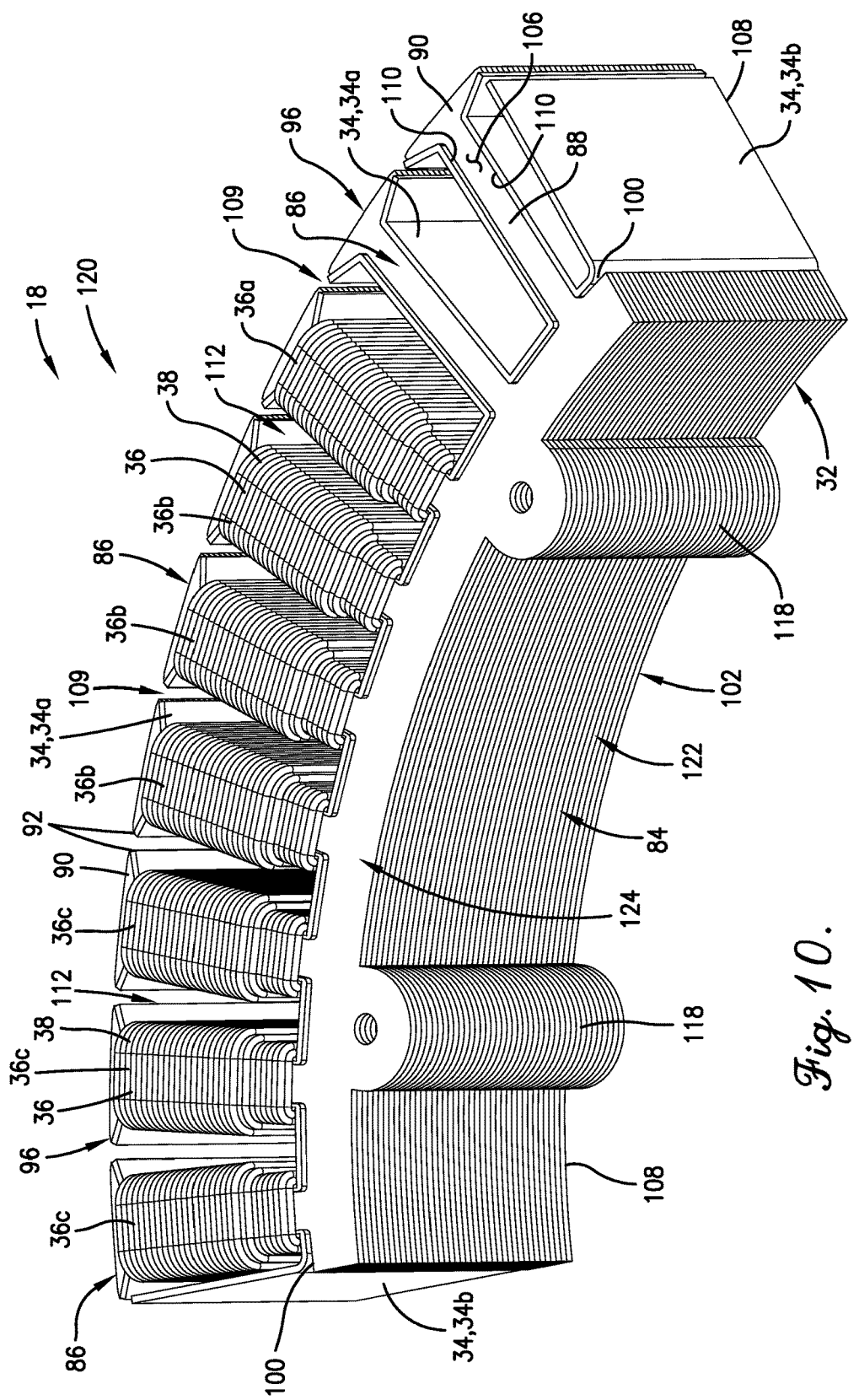
FIG. 10 is an inner top perspective view of a single section of the stator of FIG. 9, with two of the coils removed.
Figure 11:
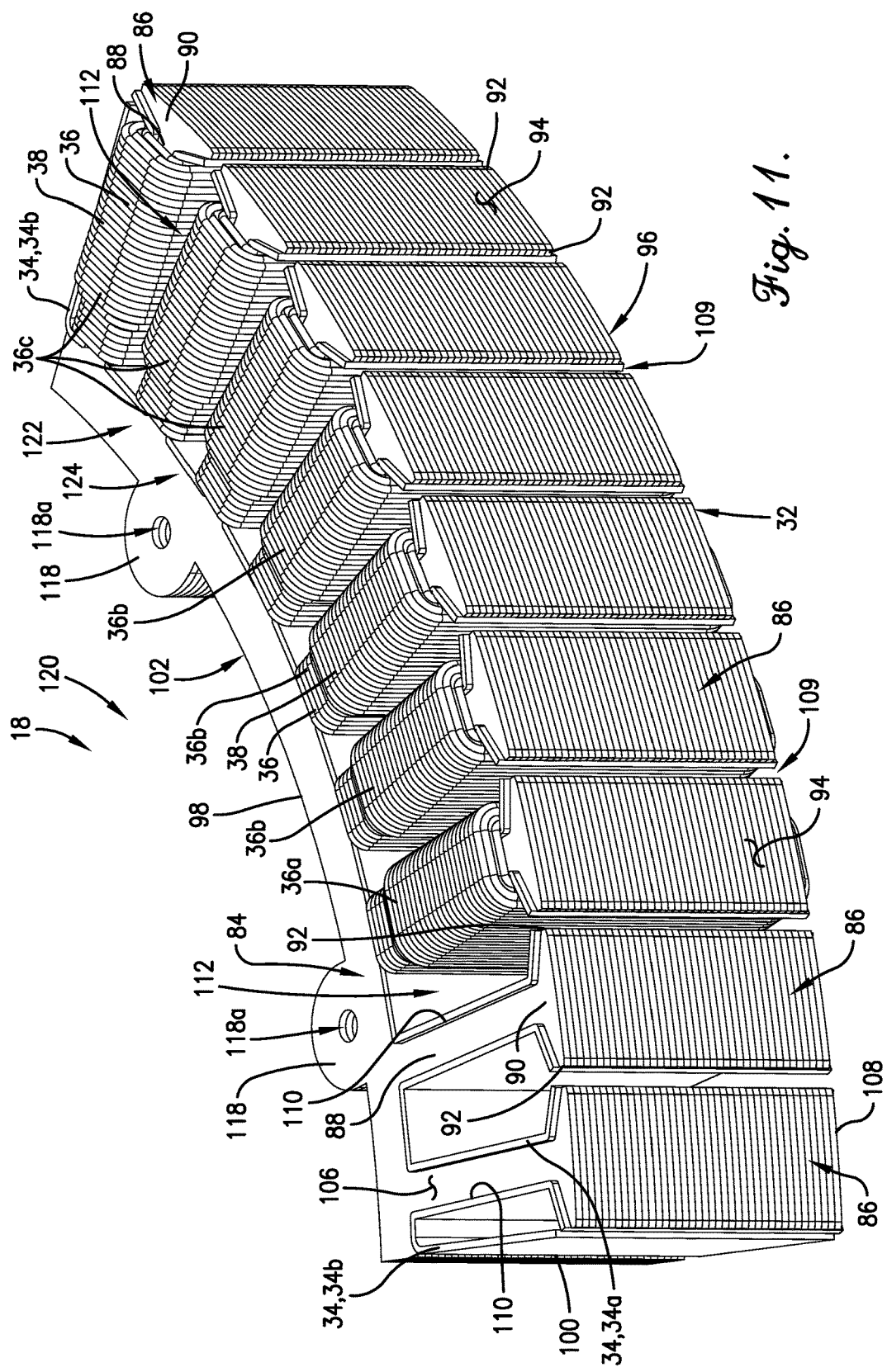
FIG. 11 is an outer top perspective view of the stator section of FIG. 10, with the same two coils removed.
Figure 12:
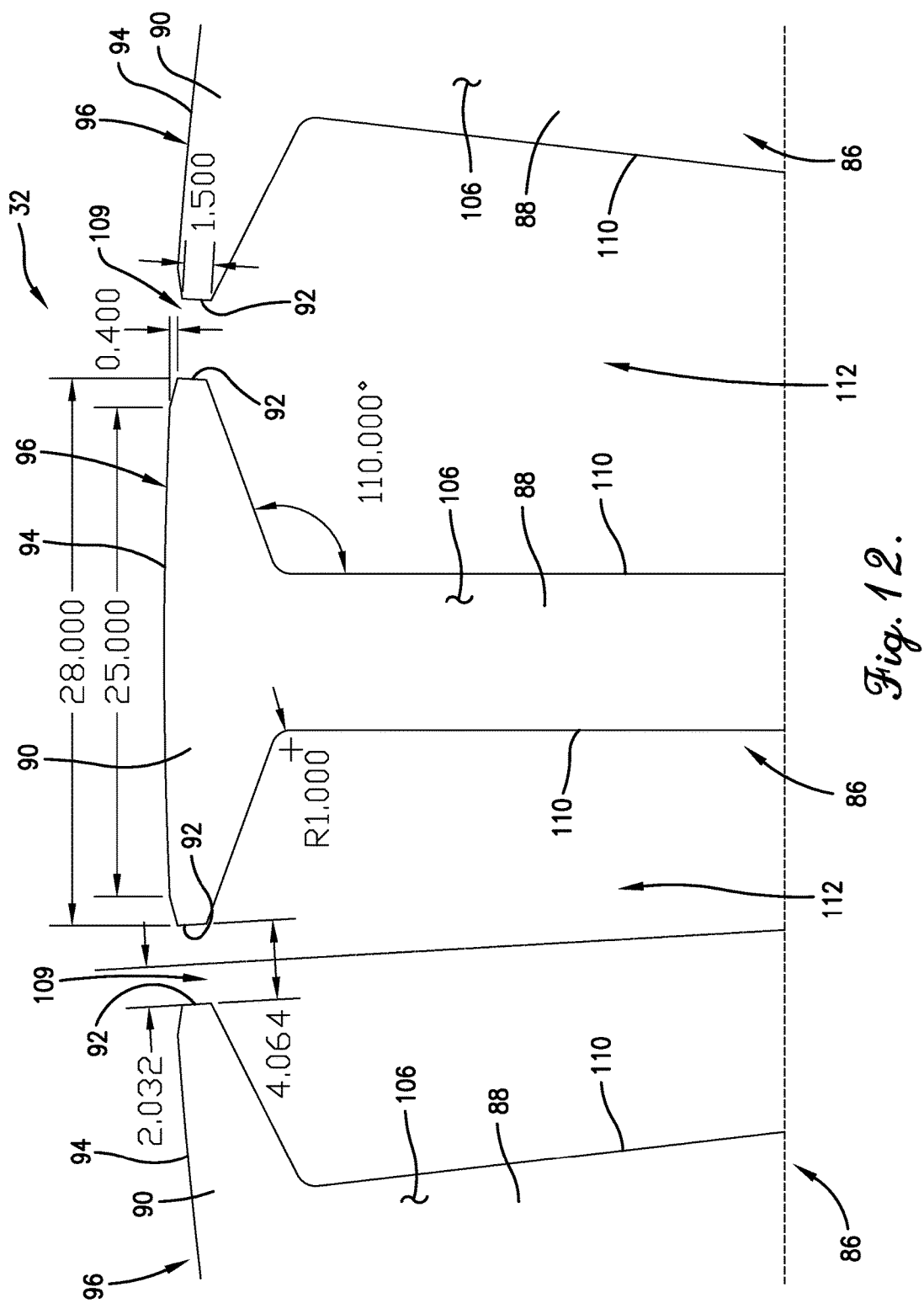
FIG. 12 is an enlarged, fragmentary top view of the teeth of the stator of FIGS. 9-11.

As noted previously, the covering 34 preferably comprises a plurality of individual, generally U-shaped slot inserts 34a inserted into the slots 112 to partly insulate the teeth 86. As best shown in FIGS. 9-11, the covering 34 further preferably includes a plurality of individual, generally U-shaped interface inserts 34b inserted into the halves of the slots 112 at the arcuate ends of each stator section 120. Upon interconnection of the stator sections 120, two (2) of the interface inserts 34b are therefore preferably provided in each cooperatively defined full slot 112. The interface inserts 34b of adjacent sections 120 thus preferably provide a dual insulative layer 34c between adjacent coils 36 of adjacent ones of the sections 120.

Provision of a sectioned stator 18 is advantageous for several reasons. For instance, particularly in view of the large dimensions and weight of the stator 18, provision of stator sections 120 enables more convenient and manageable assembly of the of the motor 14. For example, with respect to weight, the stator 18 (including both the stator core and the coils 36) for a preferred ten (10) foot fan preferably weighs about twenty-two and seventeen hundredths (22.17) lb. The stator 18 for a preferred twenty-four (24) foot fan preferably weighs about eighty-eight and thirty-six hundredths (88.36) lb. Division of the stator 18 into six (6) sections 120 results in six (6) sections 120 having much more manageable weights of about three and six hundred ninety-five thousandths (3.695) lb and seventeen and six hundred seventy-two thousands (17.672) lb, respectively.

The smaller sections 120 can also be wound more conveniently and using smaller winding equipment than would be required for a single, large stator core.

Furthermore, division of the stator core 32 into smaller core sections 122 simplifies the punching process of the core laminations and enables the punching process to be conducted in a manner that greatly minimizes scrap relative to that which would be associated with punching of a complete toroidal core.

As noted previously, the motor 14 is preferably a three (3)-phase motor 14. The motor 14 preferably includes an A-phase, a B-phase, and a C-phase. Preferably, each of the A-phase, the B-phase, and the C-phase is present on each of the stator sections 120. In a preferred embodiment, for instance, each stator section 120 includes three (3) A-phase coils 36a, three (3) B-phase coils 36b, and three (3) C-phase coils 36c.

Figure 13:
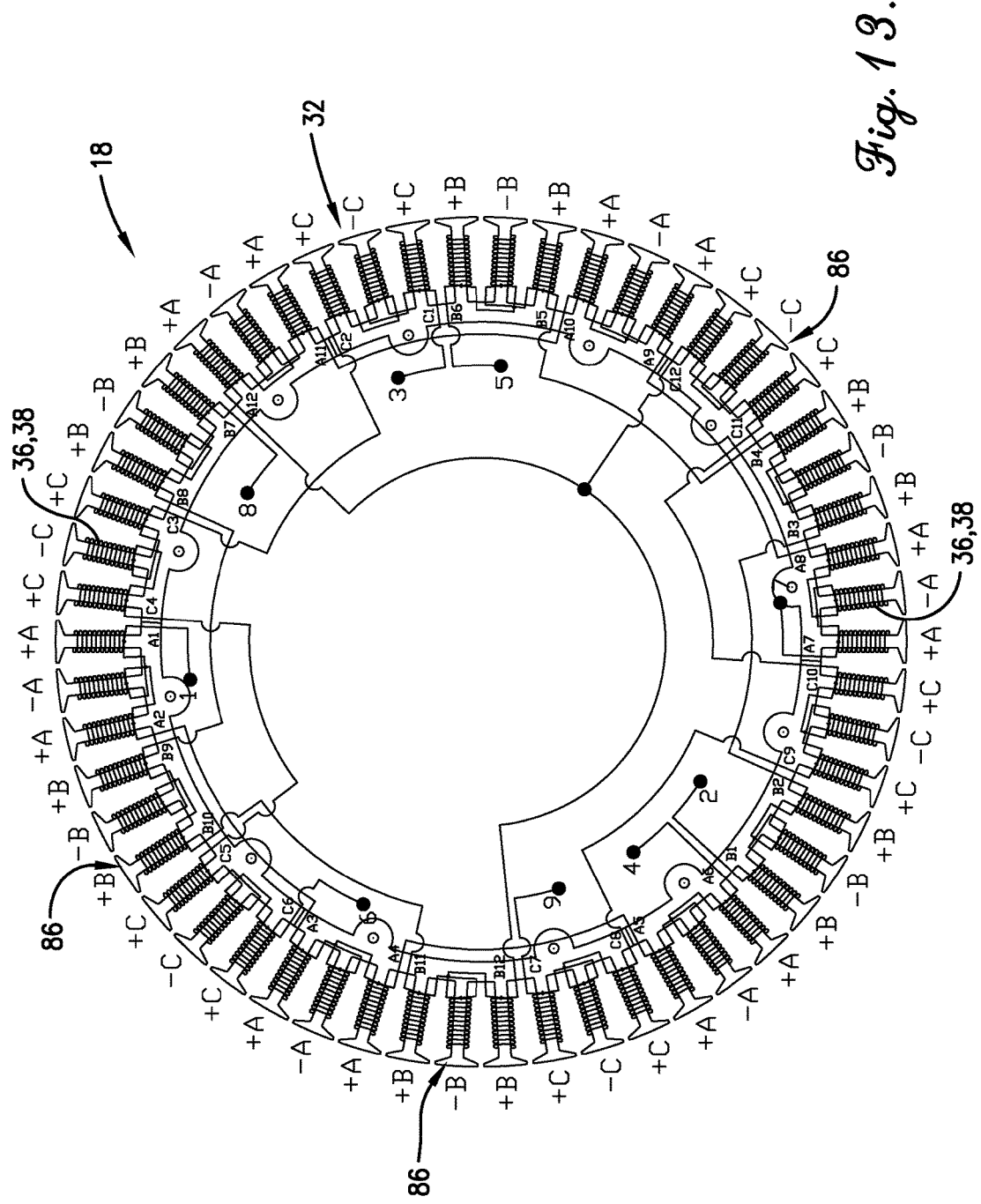
FIG. 13 is a schematic top view and wiring diagram of the stator of FIG. 9.
Figure 14:
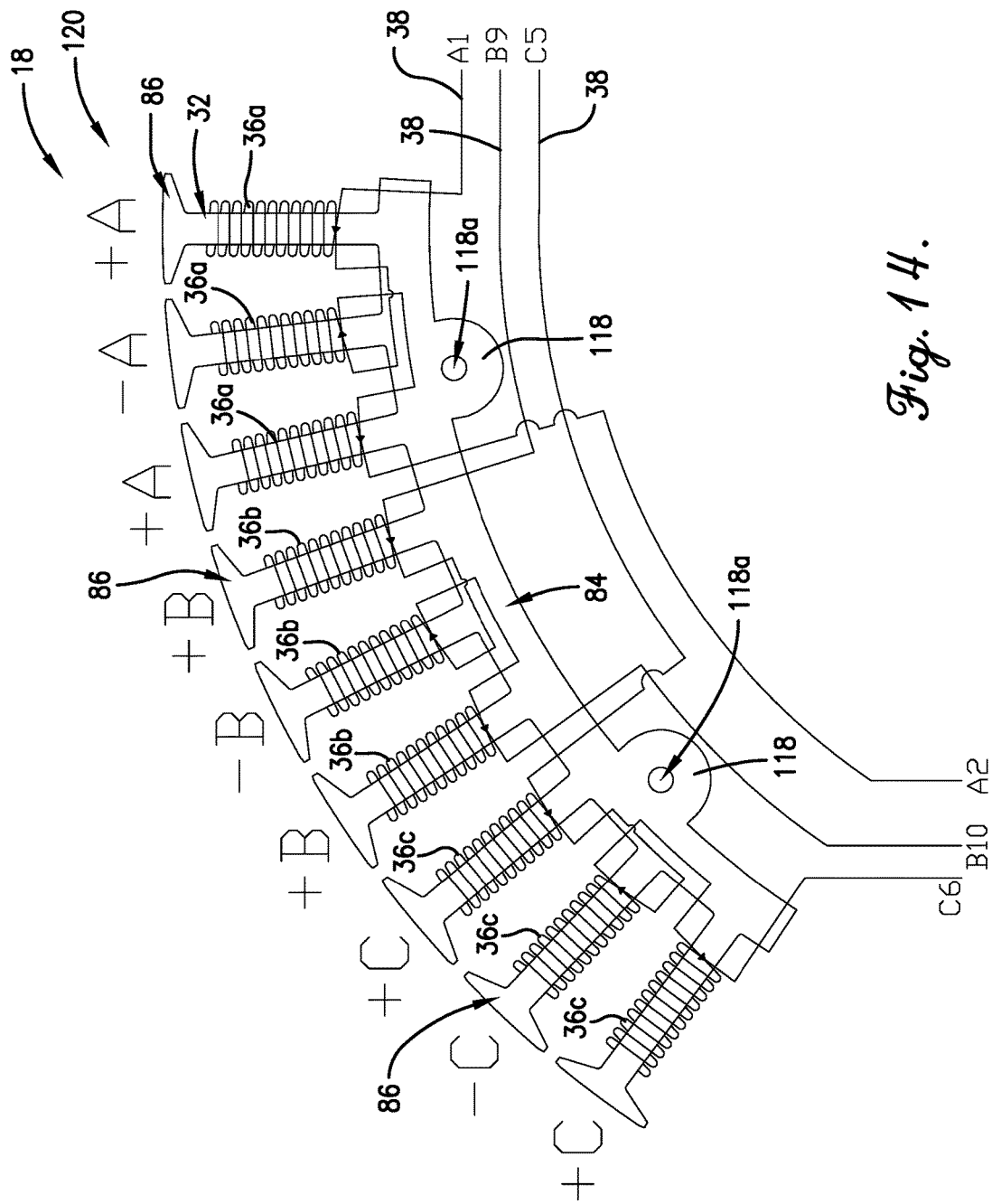
FIG. 14 is a schematic top view and wiring diagram of the stator section of FIGS. 10 and 11.

As illustrated in additional detail in FIG. 13, each power phase of a preferred multi-phase motor corresponds to a single winding. As noted previously, each coil 36 is formed by a single winding and is therefore associated with a single one of the power phases. Multiple adjacent coils 36 of the same winding that do not have any interspersed coils 36 corresponding to a different power phase, form a phase set. Adjacent phase sets illustrated in FIG. 13 therefore include: Set I (+A, −A, +A); Set II (+C, −C, +C); Set III (+B, −B, +B), and so on and so forth. In embodiments having a sectioned stator 18, it is preferred that each of the stator sections 120 includes coils 36 corresponding to all of the power phases. It is additionally preferred that an equal number of coils 36 are provided on each stator section 120 for each of the power phases. Therefore, in the preferred three (3)-phase motor 14 having fifty-four (54) teeth 86 and six (6) stator sections 120, each such stator section 120 preferably includes three (3) phase sets each corresponding respectively to a different one of the three (3) power phases. Each such phase set includes three (3) teeth 86.

Provision of all three (3) phases on each of the stator sections 120 preferably keeps forces balanced. It is however, foreseen that a multiphase motor may operate in more or fewer power phases, may include more or fewer teeth and corresponding coils, may employ phase sets including more or fewer coils, and/or may employ phase sets having varying numbers of coils, without departing from the spirit of the present inventive concept.

Because the windings for all of the power phases of the motor are provided on each stator section 120, the motor is operable with less than a full ring of stator sections (e.g., less than the six (6) sections 120 shown in the preferred embodiment). That is to say, as previously noted, according to certain aspects of the present invention, the sectioned stator 18 need not be formed of a continuous ring of stator sections. The sectioned stator may alternatively be formed of a single section that extends substantially less than continuously around the rotor axis (most preferably less than about two hundred seventy degrees (270°), or two (2) or more sections that do not cooperatively encircle the rotor axis. With alternative embodiments including multiple stator sections (where the sections do not encircle the rotor axis), the sections may be immediately adjacent one another (with substantially no arcuate space or gap therebetween), spaced arcuately apart, or some combination thereof. If the sectioned stator includes multiple arcuate gaps between sections, the spacing is preferably equal to ensure proper balancing.

Although simultaneous operation of all of the stator sections 120 is preferred, the aforementioned winding scheme enables the motor to operate through use of only one or only a portion of the stator sections 120, albeit with lower torque capabilities.

Still further, such a winding scheme allows connections between stator sections to be made in series, although parallel connections are permissible as well. Such connections are comparatively simple, reducing the likelihood of assembly error.

Furthermore, assembly of the stator sections 120 to form the stator 18 can occur at the end of the stator assembly process, after individual sections 120 have been completely wound.

CONCLUSION

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently in the above description.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention.

What is claimed is:

1. A multiphase electric motor comprising:
   a rotor rotatable about a rotor axis; and
   a sectioned stator comprising a plurality of arcuately arranged stator sections, each of said stator sections including a core section, with the core section including a yoke and a plurality of arcuately spaced apart teeth that extend generally radially from the yoke, said stator including a plurality of electrically conductive wire windings, each of which corresponds with a respective power phase, each of said stator sections being wound with each of said windings, such that each stator section includes windings for all of the power phases;

said windings being wound around the teeth to form a wire coil around each tooth, each of said wire coils being formed by a single one of the windings, such that each wire coil is associated with the respective power phase, said teeth of each core section being arranged into phase sets, each of which includes multiple teeth wound by a corresponding one of the windings, said multiple teeth of each phase set being grouped side by side so as to avoid interspersing of teeth from different phase sets.

2. The multiphase electric motor as claimed in claim 1, said stator including three of the windings corresponding to three respective power phases each of said phase sets including three teeth.

3. The multiphase electric motor as claimed in claim 2, said stator including six of said stator sections.

4. The multiphase electric motor as claimed in claim 3, said rotor presenting sixty poles,
said stator presenting fifty-four slots.

5. The multiphase electric motor as claimed in claim 1, said stator sections cooperatively extending at least substantially continuously about the rotor axis.

6. The multiphase electric motor as claimed in claim 5, said rotor circumscribing the stator, such that at least part of the stator is radially inside the rotor.

7. The multiphase electric motor as claimed in claim 6, said rotor including a rotor can that presents a plurality of circumferentially spaced fan blade mounting flanges.

8. The multiphase electric motor as claimed in claim 1, said stator including a support platform,
said stator sections being fixed to the platform.

9. The multiphase electric motor as claimed in claim 8, each of said core sections including a plurality of fastener-receiving lugs,
said stator including a plurality of fasteners, each of which is received in a corresponding one of the lugs and secured to the platform.

10. The multiphase electric motor as claimed in claim 1, said stator presenting an outer diameter of between about five hundred thirty millimeters and about five hundred seventy millimeters,
said rotor circumscribing the stator, such that at least part of the stator is radially inside the rotor,
said rotor comprising a plurality of arcuately arranged rotor sections, each of which includes a plurality of magnets.

11. The multiphase electric motor as claimed in claim 10, said rotor sections being equal in number to the stator sections.

12. The multiphase electric motor as claimed in claim 10, each of said core sections having an axial height of between about one-half inch to about two and one-half inches.

13. The multiphase electric motor as claimed in claim 1, said electric motor having an outer diameter of between about twenty inches and about twenty-six inches.

14. The multiphase electric motor as claimed in claim 1, each of said teeth including a generally radially extending arm and a crown projecting generally arcuately from the arm,
said crown defining a pair of arcuately spaced apart tooth tips, with the tips of adjacent teeth defining a gap therebetween.

15. The multiphase electric motor as claimed in claim 14, said arm presenting a radial arm length and a radial arm width,
said arm length being about at least about six times greater than the arm width.

16. The multiphase electric motor as claimed in claim 15, said arm width being about eight millimeters,
said gap being about four and sixty-four thousandths millimeters.

17. The multiphase electric motor as claimed in claim 16, said stator sections being arcuately spaced apart, such that the stator is noncontinuous.

18. A multiphase electric motor comprising:
a rotor rotatable about a rotor axis; and
a sectioned stator comprising a plurality of arcuately arranged stator sections,
each of said stator sections including a core section, with the core section including a yoke and a plurality of arcuately spaced apart teeth that extend generally radially from the yoke,
said stator comprising a plurality of electrically conductive wire windings, each of which corresponds with a respective power phase,
each of said stator sections being wound with each of said windings, such that each stator section includes windings for all of the power phases;
said windings being wound around the teeth to form a wire coil around each tooth,
each of said wire coils being formed by a single one of the windings, such that each wire coil is associated with the respective power phase,
said teeth of each core section being arranged into phase sets, each of which includes multiple teeth wound by a corresponding one of the windings,
each of said phase sets including three of the teeth.

19. The multiphase electric motor as claimed in claim 18, said stator sections cooperatively extending at least substantially continuously about the rotor axis.

20. The multiphase electric motor as claimed in claim 18, said multiple teeth of each phase set being grouped side-by-side so as to avoid interspersing of teeth from different phase sets.

* * * * *